(12) United States Patent
Kolar et al.

(10) Patent No.: US 12,199,847 B2
(45) Date of Patent: *Jan. 14, 2025

(54) ANOMALY DETECTION OF MODEL PERFORMANCE IN AN MLOPS PLATFORM

(71) Applicant: Cisco Technology, Inc., San Jose, CA (US)

(72) Inventors: Vinay Kumar Kolar, San Jose, CA (US); Jean-Philippe Vasseur, Saint Martin D'uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,532

(22) Filed: Mar. 16, 2022

(65) Prior Publication Data

US 2022/0353166 A1 Nov. 3, 2022

Related U.S. Application Data

(63) Continuation of application No. 16/710,836, filed on Dec. 11, 2019, now Pat. No. 11,310,141.

(51) Int. Cl.
*G06N 5/04* (2023.01)
*G06F 17/18* (2006.01)
(Continued)

(52) U.S. Cl.
CPC .............. *H04L 43/08* (2013.01); *G06F 17/18* (2013.01); *G06F 18/24* (2023.01); *G06N 20/00* (2019.01); *H04L 43/14* (2013.01)

(58) Field of Classification Search
CPC ......... H04L 43/14; G06F 17/18; G06N 20/00; G06K 9/6267
See application file for complete search history.

(56) References Cited

U.S. PATENT DOCUMENTS 8,078,556 B2 12/2011 Adi et al.
8,725,667 B2 5/2014 Kaushal et al.
(Continued)

OTHER PUBLICATIONS

Gupta, M. et al., "Outlier Detection for Temporal Data: A Survey", IEEE Transactions on Knowledge and Data Engineering, vol. 26, No. 9, Sep. 2014, pp. 2250-2267.
(Continued)

*Primary Examiner* — Christopher B Robinson
(74) *Attorney, Agent, or Firm* — BEHMKE INNOVATION GROUP LLC; James M. Behmke; James J. Wong

(57) ABSTRACT

In one embodiment, a service tracks performance of a machine learning model over time. The machine learning model is used to monitor one or more computer networks based on data collected from the one or more computer networks. The service also tracks performance metrics associated with training of the machine learning model. The service determines that a degradation of the performance of the machine learning model is anomalous, based on the tracked performance of the machine learning model and performance metrics associated with training of the model. The service initiates a corrective measure for the degradation of the performance, in response to determining that the degradation of the performance is anomalous.

19 Claims, 10 Drawing Sheets

(51) Int. Cl.
  *G06F 18/24* (2023.01)
  *G06N 20/00* (2019.01)
  *H04L 43/00* (2022.01)
  *H04L 43/08* (2022.01)

(56) References Cited

U.S. PATENT DOCUMENTS

| | | | |
|---|---|---|---|
| 9,349,103 B2 | 5/2016 | Eberhardt, III et al. | |
| 9,632,858 B2 | 4/2017 | Sasturkar et al. | |
| 10,270,788 B2 | 4/2019 | Faigon et al. | |
| 2014/0237595 A1* | 8/2014 | Sridhara | G06F 21/566 709/224 |
| 2015/0074035 A1* | 3/2015 | Narasappa | G06N 7/01 706/52 |
| 2015/0074283 A1 | 3/2015 | Karthikeyan | |
| 2015/0254555 A1* | 9/2015 | Williams, Jr. | G06N 3/045 706/14 |
| 2015/0304191 A1* | 10/2015 | Groenendijk | H04L 5/0092 370/252 |
| 2017/0220407 A1 | 8/2017 | Estrada | |
| 2017/0330109 A1* | 11/2017 | Maughan | G06N 5/04 |
| 2017/0353991 A1* | 12/2017 | Tapia | G06Q 10/20 |
| 2017/0364819 A1* | 12/2017 | Yang | H04L 41/16 |
| 2018/0248905 A1* | 8/2018 | Côté | G06N 3/08 |
| 2019/0279109 A1* | 9/2019 | Guelman | G06F 16/285 |
| 2020/0125586 A1 | 4/2020 | Rezaeian | |
| 2020/0151619 A1* | 5/2020 | Mopur | H04L 67/12 |
| 2020/0193234 A1* | 6/2020 | Pai | G06F 16/904 |
| 2020/0201727 A1* | 6/2020 | Nie | G06N 20/00 |
| 2021/0012187 A1 | 1/2021 | Turgeman | |
| 2021/0097433 A1* | 4/2021 | Olgiati | G06F 11/0793 |
| 2021/0158106 A1 | 5/2021 | Vasseur et al. | |

OTHER PUBLICATIONS

Sutskever, et al., "Sequence to Sequence Learning with Neural Networks", https://arxiv.org/abs/1409.3215, Dec. 14, 2014, 9 pages.
"MLOps", online: https://en.wikipedia.org/wiki/MLOps, dated Jan. 11, 2019, printed Nov. 19, 2019, 2 pages, Wikimedia Foundation, Inc.

* cited by examiner

ANOMALY DETECTION OF MODEL PERFORMANCE IN AN MLOPS PLATFORM

CROSS-REFERENCE TO RELATED APPLICATION

This application is a continuation of U.S. patent application Ser. No. 16/710,836, filed on Dec. 11, 2019, entitled ANOMALY DETECTION OF MODEL PERFORMANCE IN AN MLOPS PLATFORM, by Vinay Kumar Kolar, et al., the entire contents of which are incorporated by reference herein.

TECHNICAL FIELD

The present disclosure relates generally to computer networks, and, more particularly, to anomaly detection of model performance in a machine learning operations (MLOps or ML Ops) platform.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

Unfortunately, machine learning-based systems are unavoidably complex in that they typically ingest data that can change over time and from any number of different sources, which can also change over time (e.g., as the network evolves). This makes it challenging to discern whether any issue detected in the network by such a system is truly a network issue or is, instead, attributable to poor performance of the machine learning model assessing the network or problems in the data ingested by the model.

DESCRIPTION OF EXAMPLE EMBODIMENTS

Overview

Figure 1A:
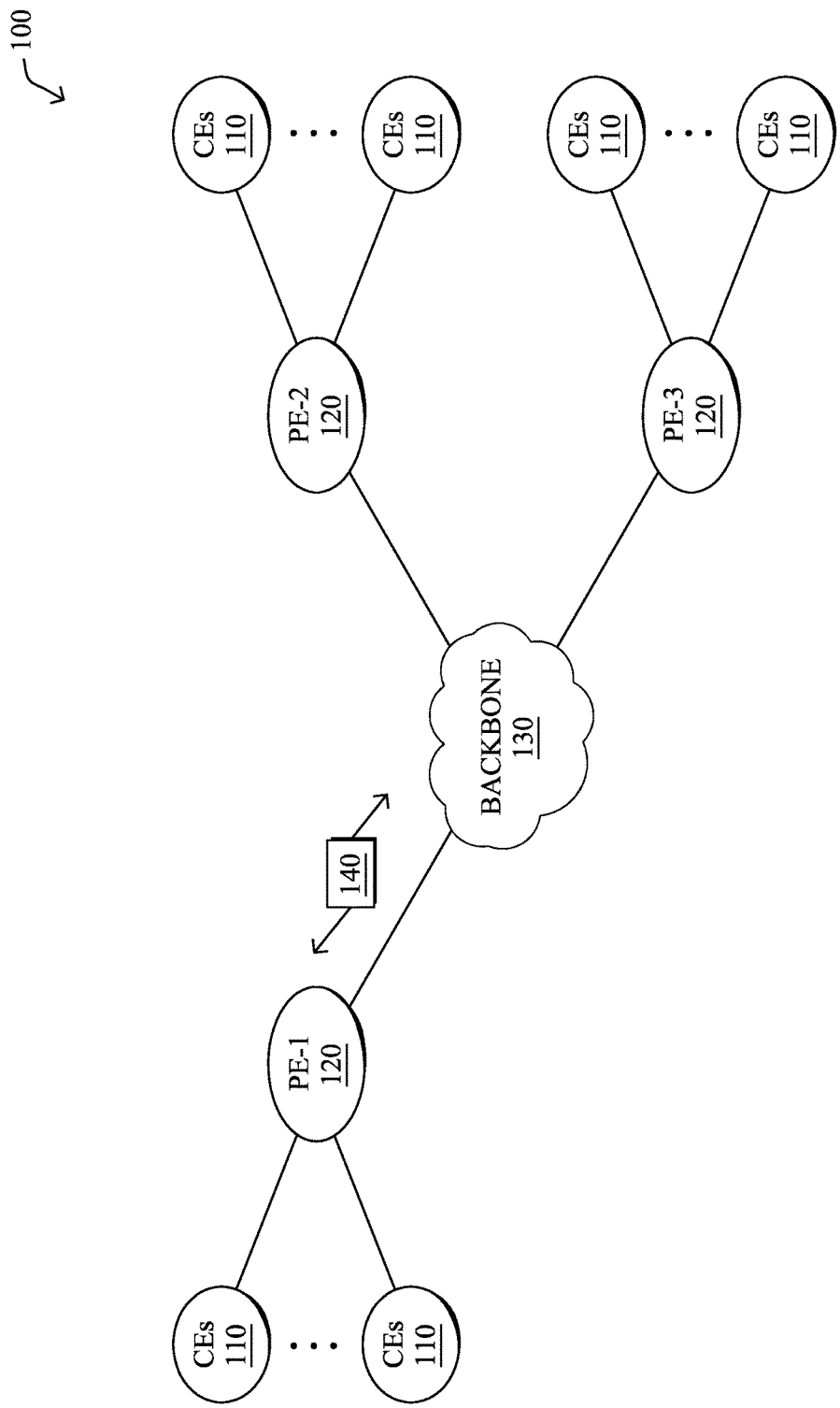
FIGS. 1A-1B illustrate an example communication network.

According to one or more embodiments of the disclosure, a service tracks performance of a machine learning model over time. The machine learning model is used to monitor one or more computer networks based on data collected from the one or more computer networks. The service also tracks performance metrics associated with training of the machine learning model. The service determines that a degradation of the performance of the machine learning model is anomalous, based on the tracked performance of the machine learning model and performance metrics associated with training of the model. The service initiates a corrective measure for the degradation of the performance, in response to determining that the degradation of the performance is anomalous.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
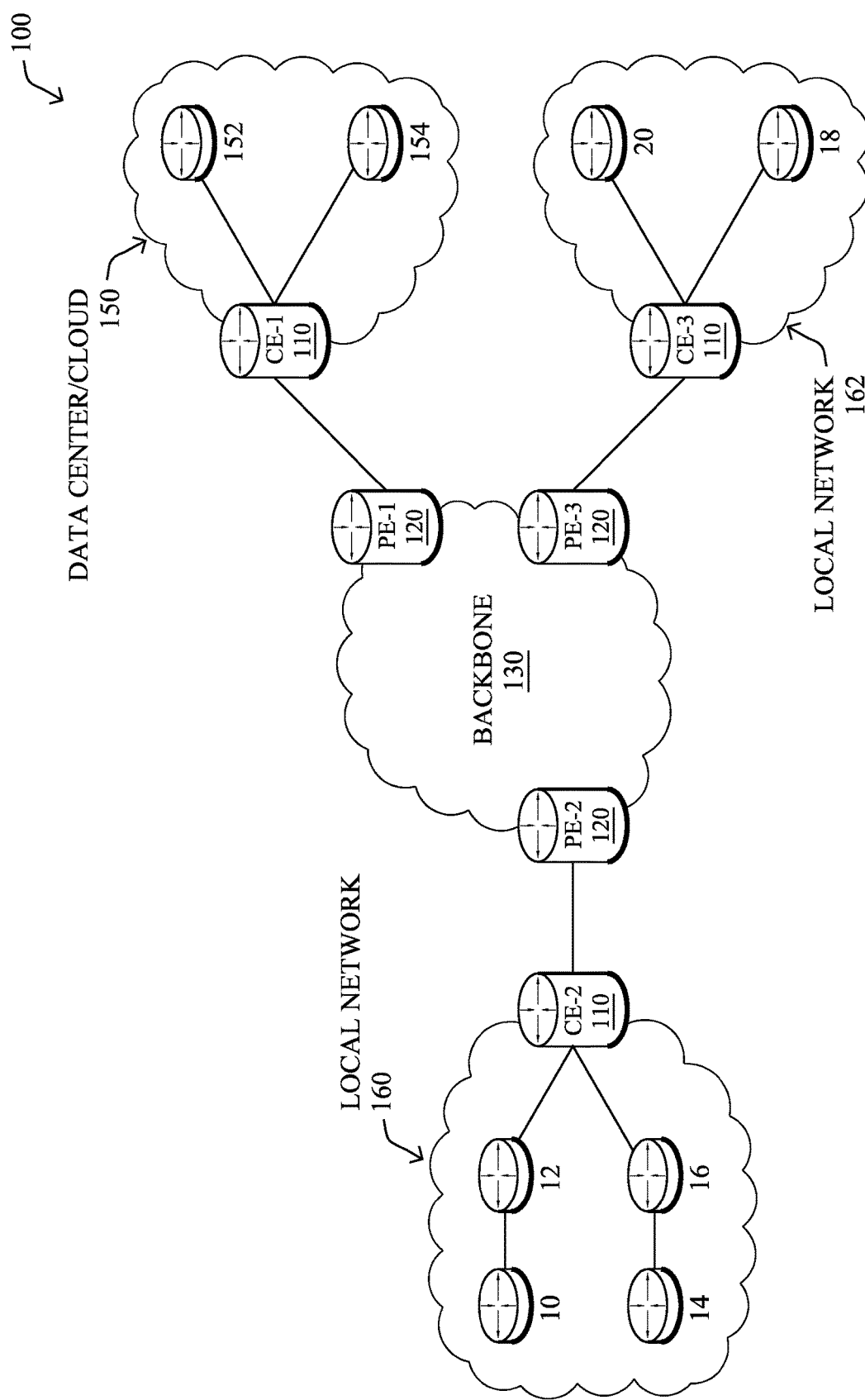

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
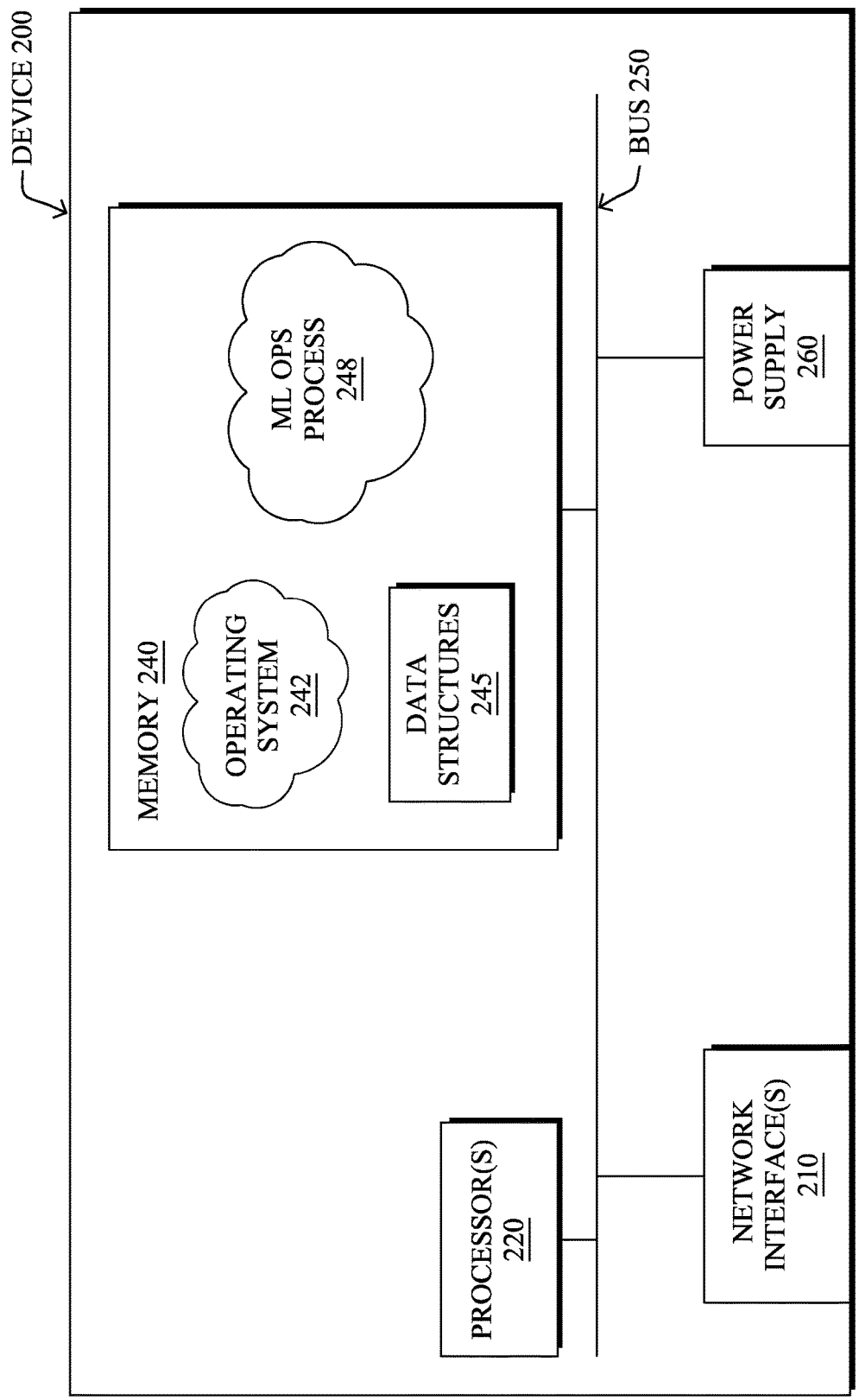
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning operations (ML Ops or MLOps) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

ML Ops process 248 includes computer executable instructions that, when executed by processor(s) 220, cause device 200 to perform ML Ops functions as part of a network monitoring infrastructure for one or more networks. In general, ML Ops refers to the mechanisms by why machine learning models are created, deployed, and monitored over time. More specifically, in various embodiments, ML Ops process 248 may oversee the operations of one or more network monitoring services that utilize machine learning, such as a network assurance service, a device classification service, a network security service, or the like.

In some embodiments, ML Ops process 248 may itself utilize machine learning techniques, to monitor and adjust the operations of any number of ML-based network services. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML Ops process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that ML Ops Process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
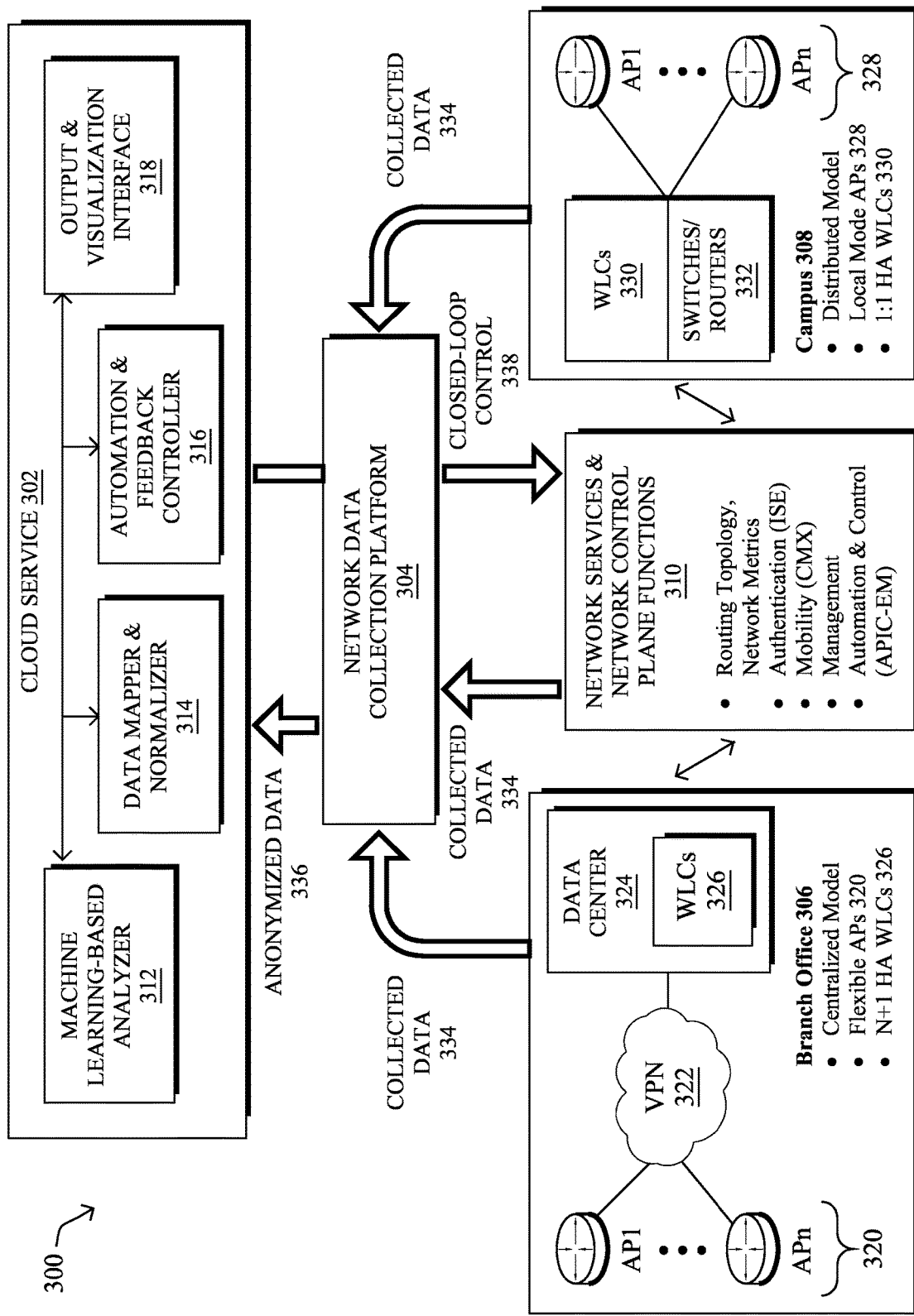
FIG. 3 illustrates an example network assurance system that uses machine learning to monitor a network.

FIG. 3 illustrates an example network assurance system 300 that uses machine learning to monitor a network, according to various embodiments. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support monitoring for both wireless and wired networks, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP) v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, systems/services that use machine learning to monitor a network, such as service 302, are unavoidably complex, ingest data from multiple sources, and may rely on multiple versions of a trained model to make inferences about the network. Indeed, such a monitoring system/service may collect and analyze data from any number of network elements with different configurations (e.g., OS versions, software, etc.), endpoints, servers such as Authentication, Authorization and Accounting (AAA) and DHCP servers, and the like. As a consequence, the data that is consumed by the ML models of the monitoring service (e.g., the models of machine learning-based analyzer 312, etc.) is dynamic and usually varies over time across different networks, as the configurations of the networks change. This makes it challenging to discern between actual problems in the network and issues in the collected data and/or performance issues exhibited by the machine learning model assessing the network. This can lead to the monitoring system needlessly initiating corrective measures in the network (e.g., rerouting traffic, raising alerts, applying a security policy, etc.) and unintentionally impacting the performance of the network.

Anomaly Detection of Model Performance in an ML Ops Platform

The techniques herein introduce a unified methodology, architecture, and monitoring service for machine learning-based systems, to ensure their proper operation. In some aspects, the techniques herein dynamically learn the behavioral patterns of data used to train a machine learning model, allowing for the detection of anomalies in both the input data to the model and the performance of the model. In further aspects, the techniques herein introduce mechanism to identify the root causes of these types of problems, as well as the next-best action, by jointly correlating the training metrics, inference metrics, and data distributions, across any number of different networks. In doing so, corrective measures can be initiated automatically, such as raising alerts, adjusting the operations of the machine learning-based analyzer/inference engine of the monitoring service (e.g., by sending inference rules, pausing the model based on local observations, etc.), or even initiating model retraining when the data distributions and model accuracy are not in alignment with what was observed during model training.

Specifically, according to one or more embodiments of the disclosure as described in detail below, a service tracks performance of a machine learning model over time. The machine learning model is used to monitor one or more computer networks based on data collected from the one or more computer networks. The service also tracks performance metrics associated with training of the machine learning model. The service determines that a degradation of the performance of the machine learning model is anomalous, based on the tracked performance of the machine learning model and performance metrics associated with training of the model. The service initiates a corrective measure for the degradation of the performance, in response to determining that the degradation of the performance is anomalous.

Illustratively, the techniques described herein may be performed by hardware, software, and/or firmware, such as in accordance with the ML Ops process 248, or another process, which may include computer executable instructions executed by the processor 220 (or independent processor of interfaces 210) to perform functions relating to the techniques described herein.

Figure 4:
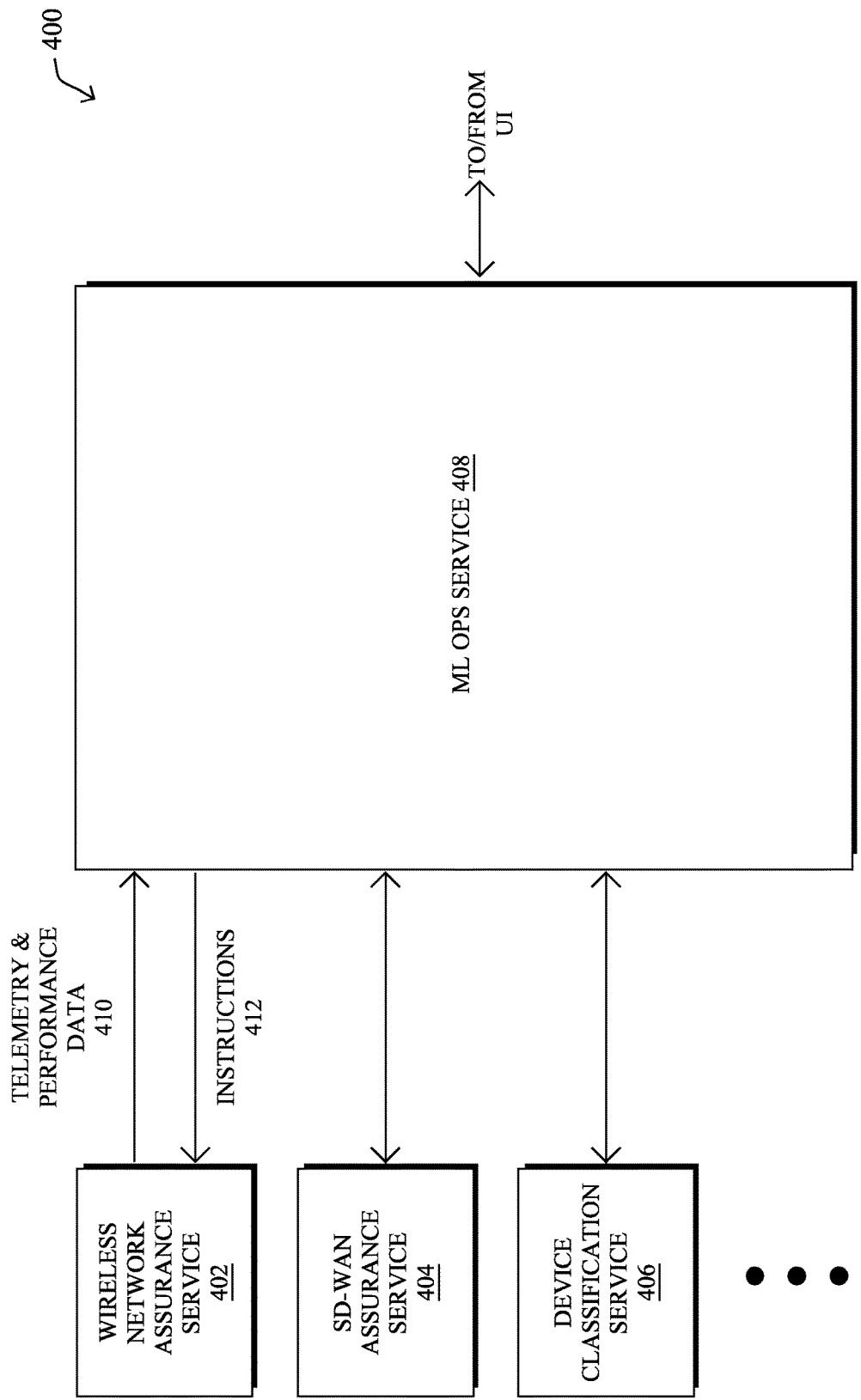
FIG. 4 illustrates an example machine learning operations (ML Ops) architecture.

Operationally, FIG. 4 illustrates an example ML Ops architecture 400, according to various embodiments. At the core of architecture 400 is a machine learning (ML) operations (Ops) service 408 (e.g., as provided by one or more devices executing ML Ops process 248) that oversees the operations of any number of machine learning-based services/systems that each monitor one or more computer networks.

For example, as shown, ML Ops service 408 may oversee the operation of a wireless network assurance service 402 that uses machine learning to monitor a wireless network, a software-defined wide area network (SD-WAN) assurance service 404 that uses machine learning to monitor an SD-WAN (e.g., to predict tunnel failures, etc.), a device classification service 406 that uses machine learning to classify devices in a network by device type, based on their behaviors, and/or any other machine learning-based network services.

During operation, a given network monitoring service may provide to ML Ops service 408 data regarding the telemetry data that it collects and is ingested by its machine learning model(s), as well as performance data regarding the performance of the model(s). For example, as shown, wireless network assurance service 402 may provide telemetry and performance data 410 to ML Ops service 408. In turn, ML Ops service 408 may assess the provided data, to determine whether there are any irregularities or other issues present in the ingested data and/or performance issues associated with the machine learning model. If ML Ops service 408 detects either condition, service 408 may initiate corrective measures such as sending an alert to a user interface (UI) or instructions back to the monitoring service. For example, service 408 may send instructions 412 to wireless network assurance service 402 that adjust how or when its machine learning model assesses its collected data (e.g., by disabling the model under certain conditions, etc.). In further cases, instructions 412 may even trigger model retraining.

More specifically, ML Ops service 408 may manage the various stages of the lifecycles of the machine learning models employed by a network monitoring service. These stages generally include the following:

1. The data ingestion stage logs data indicative of the quality of the data ingested by the monitoring service, which is provided to ML Ops service 408 for analysis (e.g., on a daily basis). For example, the data quality information may summarize the number of different entity types observed in the network (e.g., number of radios, APs, tunnels, etc.), failures or other events observed in the network, etc., for a given time period. ML Ops service 408 may use this information to detect problems related to the collection of network data by the monitoring service.
2. Similarly, the data from the extract, transform, and load (ETL) functions of the monitoring service is collected and sent to ML Ops service 408 for analysis (e.g., weekly records). For example, this information may be indicative of an average throughput for the network, onboarding times, onboarding failures, tunnel downtimes, throughputs during tunnel failures, etc. ML Ops service 408 may analyze the distributions and changes in these metrics, to detect skewed data that can lead to poor model performance.
3. The accuracy and other metrics regarding the machine learning models executed by the monitoring service is also sent to ML Ops service 408 for analysis (e.g., on a daily basis). For example, such information may be indicative of the width of the anomaly band of an anomaly detector, relevancy scores for detected anomalies, information regarding false positives or negatives by the model, true positives or negatives by the model, the recall or precision of the model, or the like. ML Ops service 408 may use this information to track changes in the performance of the model over time and other model-related issues, so as to initiate corrective measures.
4. In many cases, experimentation is also performed over time to select the 'best' model(s) for use by a monitoring service in production. ML Ops service 408 may further oversee this activity, to provide insights into the performance of a given model with respect to different datasets, networks, and/or time ranges.

The unified architecture 400 shown allows ML Ops service 408 to oversee the operations of multiple machine learning-based network monitoring services at once. In other words, ML Ops service 408 may itself be a standalone service that interfaces with any number of network monitoring services, such as services 402-406, to manage the lifecycles and health of their machine learning models.

Figure 5:
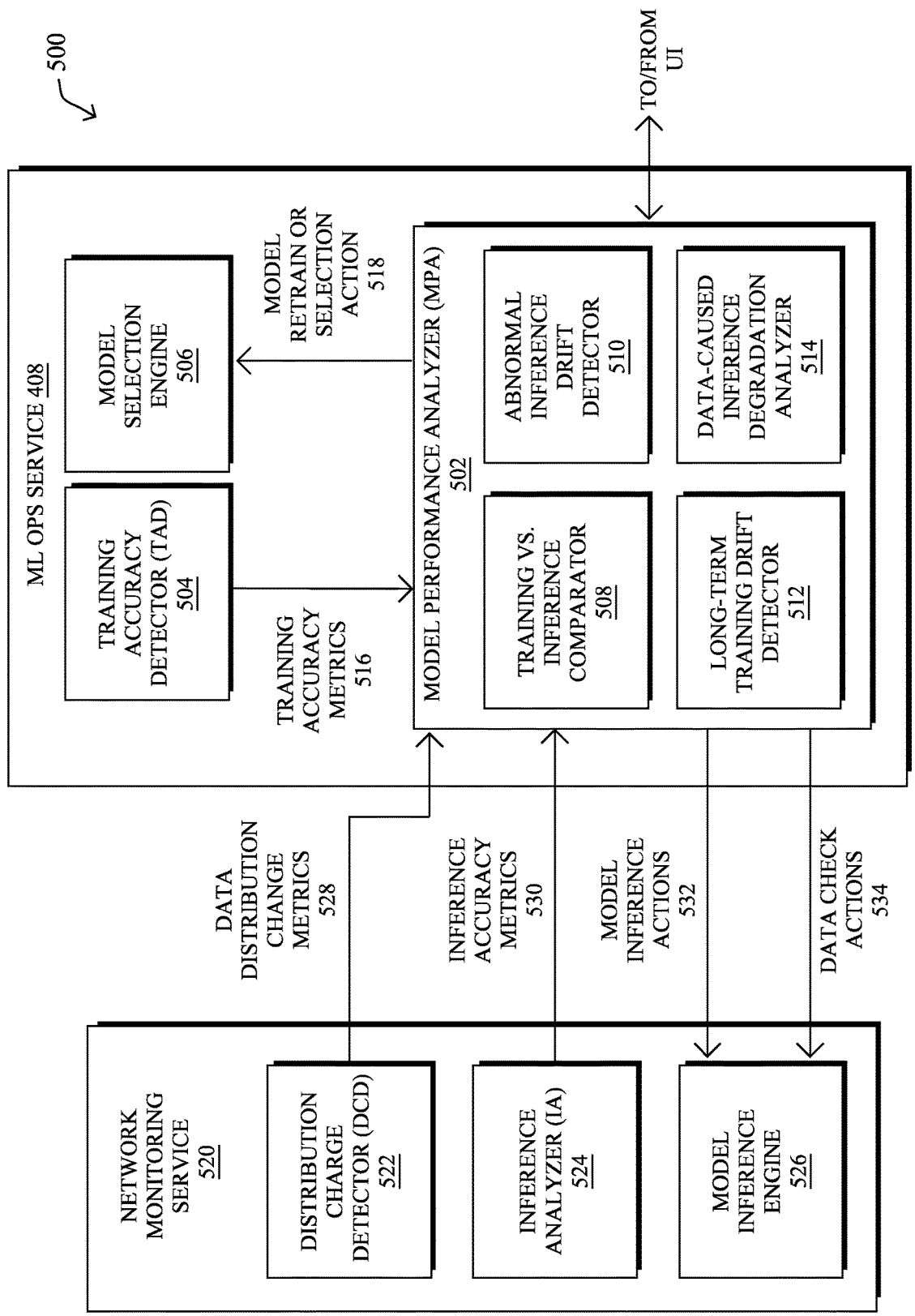
FIG. 5 illustrates an example architecture for assessing machine learning model performance.

FIG. 5 illustrates an example architecture 500 for assessing machine learning model performance, according to various embodiments. Continuing the example of FIG. 4, architecture 500 may comprise any or all of the following components: a model performance analyzer (MPA) 502, a training accuracy detector 504, a model selection engine 506, a distribution change detector 522, an inference analyzer 524, and/or a model inference engine 526. In some embodiments, some or all of the components 502-506 and 522-526 of architecture 500 may be implemented as part of a machine learning-based network monitoring service 520 itself (e.g., any of services 402-406 in FIG. 4) or, alternatively, as part of a stand-alone service ML Ops service 408 that is in communication therewith. For example, service 520 may leverage application programming interfaces (APIs) of ML Ops service 408, thereby allowing service 408 to oversee the operations of the machine learning components of network monitoring service 502.

In general, the various components of architecture 500 operate in conjunction with one another to provide an ML Ops platform that can: 1.) dynamically detect issues with the accuracy of training and inference in production machine learning models, 2.) find anomalous performance degradations and determine their root causes, such as when the performance degradation is due to the model consuming different patterns of data than the ones on which the model was trained, 3.) send alerts to the appropriate downstream systems/services or personnel, and 4.) automatically take corrective action on the observed issues.

As shown, assume that network monitoring service 520 executes a model inference engine 526 (e.g., machine learning-based analyzer 312 in FIG. 3, etc.) that comprises one or more machine learning models trained to make inferences about a network monitored by service 520. In various embodiments, network monitoring service 520 may also execute a distribution change detector (DCD) 522 that is responsible for detecting significant changes in the distribution of data input to the model(s) of model inference engine 526 and providing data distribution change metrics 528 to model performance analyzer (MPA) 502 of ML Ops Service 408. As would be appreciated, DCD 522 can be hosted by any suitable component of network monitoring service 520, such as on one or more network entities that export telemetry data, as part of the network data collection platform for service 520, or even in the cloud.

Figure 6A:
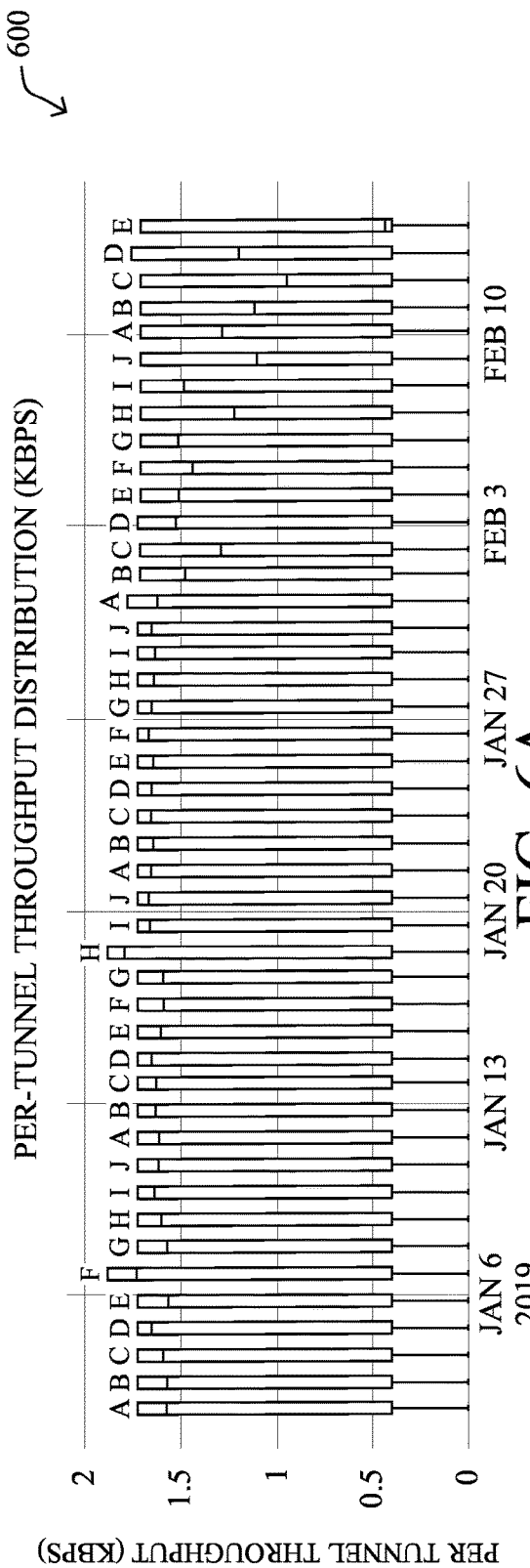
FIGS. 6A-6B illustrate example plots of the per-tunnel throughput distributions.
Figure 6B:
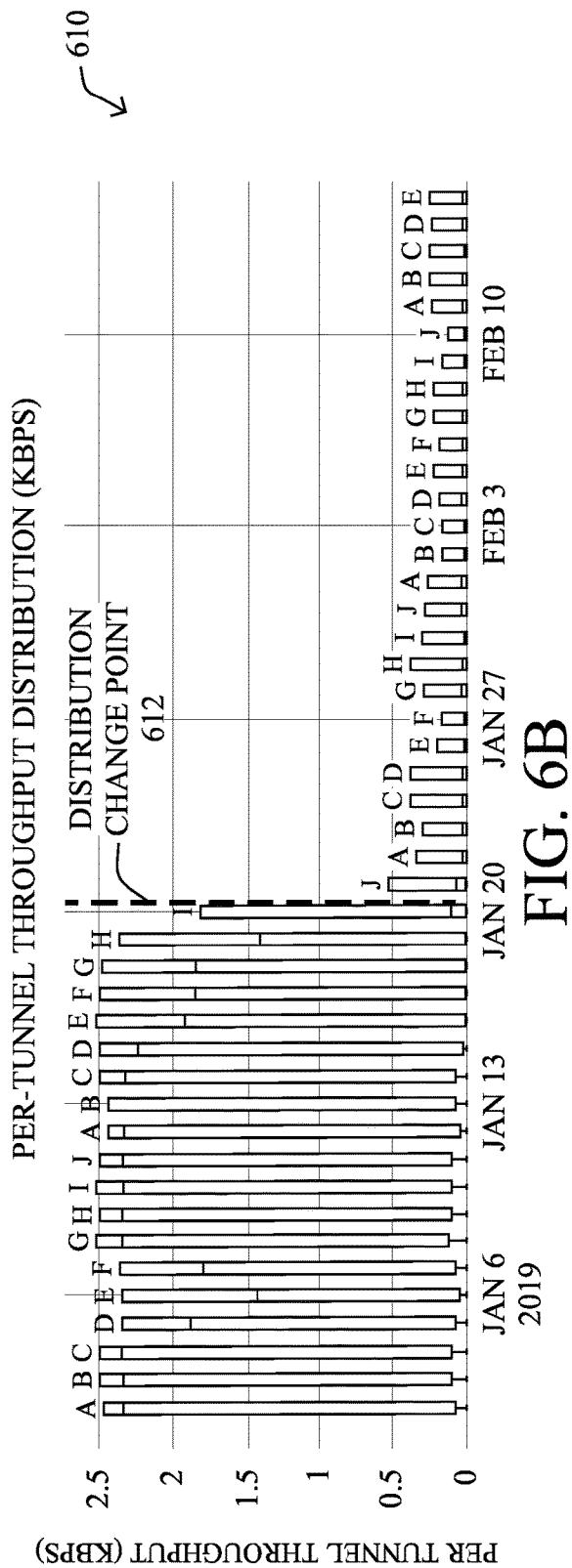

By way of example, FIGS. 6A-6B illustrate example plots of the per-tunnel throughput distributions (in kbps) over time for two networks. Assume, for example, that the machine learning model of the monitoring service predicts tunnel failures in an SD-WAN, based in part on the throughputs of the tunnels. In such a case, the performance of the model may be negatively impacted, if the distributions change dramatically.

Plot 600 in FIG. 6A shows the throughput distributions for the tunnels (e.g., tunnels A-J) over time for a first network as boxplots, where only the $25^{th}$, $50^{th}$ and $75^{th}$ percentiles are shown. As can be seen, the distributions are relatively unchanged over time. In contrast, plot 610 in FIG. 6B shows the throughput distributions for tunnels (e.g., tunnels A-J) over time for a second network.

In contrast to plot 600, the second network experienced a significant change in its tunnel throughput distributions starting on January $20^{th}$ (e.g., distribution change point 612). This change in the throughput distributions can affect the performance of the machine learning model assessing the throughput metrics and may necessitate corrective measures, such as retraining the model. By providing the detected distribution changes to the ML Ops service, the model management functions of the service can initiate the corrective measures, automatically.

Referring again to FIG. 5, DCD 522 may use any number of techniques, to determine that a distribution change in the data has occurred. In one embodiment, DCD 522 measures the empirical distribution of the data, periodically (e.g., every week), and computes the distribution of the current and prior time periods (e.g., for the current week and the past week). For each feature, DCD 522 can then use two-sample tests such as the Kolmogorov-Smirnov (KS) test, a Wasserstein distance, or a Cramer-von Mises distance for continuous features. Each of these tests will output the distribution difference metric, as specified by the test, and the p-value. In this case, the p-value ranks the confidence with which the two distributions are alike. Usually, if the p-value is less (generally, p-value<0.05), then the two distributions can be considered to be different with a high degree of significance/confidence. Hence, DCD 522 may use one the above test, and assess the result <distribution difference metric, confidence>, where confidence may be (1-p-value), to detect a distribution change. For categorical variables, DCD 522 could also employ a chi-squared test, to provide a similar output.

In another embodiment, DCD 522 may suppress the data features that are constantly changing from use by the model of model inference engine 526. This can be done by DCD 522 keeping track of the time-series of distribution changes over time (e.g., in the last n training cycles). For example, DCD 522 may store the "distribution difference" (d) metrics as a proxy for distribution change metric, i.e., [$d_1$, $d_2$, ..., $d_{(t-1)}$, $d_t$]. DCD 522 may then call a time-series forecasting algorithm with all previous values, to predict the uncertainty of difference at time t, given an input of the past [$d_1$, $d_2$, ..., $d_{(t-1)}$] distribution changes. If the uncertainty is high (e.g., the uncertainty band>threshold), then DCD 522 may conclude that the data distribution has high-variance, and forcefully set the distribution-difference metric to zero. DCD 522 can also leverage change point detection techniques, to detect "when" the data changed significantly.

DCD 522 may regularly compute the data distribution change metrics 528 for the data consumed by model inference engine 526 and transmit metrics 528 to model performance analyzer (MPA) 502 on a push, pull, or periodic basis. For example, data distribution change metrics 528 may be of the form <customer, timestamp, feature, distribution-difference, confidence, min, percentile-25, percentile-50, percentile-75, max>, where the last few metrics showcase the approximate distribution of the variables by using the $25^{th}$, $50^{th}$ and $75^{th}$ percentiles with the maximum and minimum values of the data feature.

Another component of architecture 500 may be inference analyzer (IA) 524, according to various embodiments. During execution, IA 524 may be responsible for measuring and tracking the accuracy of the inferences made by the model(s) of model inference engine 526. In turn, IA 524 may provide the inference accuracy metrics 530 to MPA 502, such as when the performance of the model crosses a predefined threshold (e.g., the performance dips below a certain threshold). For example, assume that model inference engine 526 uses a machine learning model to detect anomalous conditions in the monitored network. In such a case, IA 524 may capture and assess the performance metrics for the model (e.g., anomaly margins, etc.) and/or other aggregate system metrics (e.g., the number of raised anomalies, etc.). In turn, IA 524 may report such inference accuracy metrics 530 to MPA 502 periodically, in response to one or more of the metrics crossing a predefined threshold, or on a push or pull basis.

In one embodiment, IA 524 uses timeseries algorithms to detect the change in inference performance metrics of the model(s) of model inference engine 524. This can be done using various statistical techniques such as change point detection (e.g., Bayesian, CumSum, etc.) or by just comparing the statistical metrics (e.g., mean, median, etc.) of inference over time. The significant changes in inference (e.g., sudden decrease in inference accuracy, etc.) are then sent by IA 524 to MPA 502 via inference accuracy metrics 530.

Another component of architecture 500 may be training accuracy detector (TAD) 504. In various embodiments, TAD 504 is responsible for identifying sudden changes and anomalies in the training of the model(s) of model inference engine 526. The model(s), when registered with ML Ops service 408, will be associated with the model performance metrics to be monitored during model training. For example, in the case of a classification model, the model may be registered with service 408 to monitor its precision, recall, area under curve (AUC). Similarly, if the model is a regression model, it may be registered with service 408 to monitor its R-squared, root means square error (RMSE), or quantile loss. A complex model may register with service 408 to monitor multiple metrics. For example, if two models of model inference engine 526 are used to predict the anomaly bands (e.g., top and bottom prediction bands), then quantile loss and R-squared metrics can be monitored for each regressor. In addition to model metrics, TAD 504 can also be instructed to measure other system performance metrics, as well, such as the percentage of the records that are tagged as anomalies in the test set for the model.

Said differently, TAD 504 may monitor the performance/accuracy-related metrics associated with the training and testing of a machine learning model deployed to network monitoring service 520. For example, such metrics may take the form: <customer, timestamp, model, metric, change-score, change-confidence>, which are tracked by TAD 504 during model training and validation. In turn, TAD 504 may provide the resulting training accuracy metrics 516 across training and/or validation sessions to MPA 502, periodically, on a push or pull basis, or in response to TAD 504 detecting sudden changes in the metrics. In one embodiment, TAD 504 may assess each model and/or system performance metric as a time-series. In a further embodiment, TAD 504 may leverage change point detection, to detect sudden increase or decrease in the metrics, triggering TAD 504 to notify MPA 502 of the changes.

In various embodiments, architecture 500 may also include MPA 502 which acts as a central engine to gather the data and events sent by the other components of architecture 500 detailed above. In turn, MPA 502 intelligently correlates the inference performance (e.g., the inference accuracy metrics 530 sent by IA 524) with that of the data distribution changes (e.g., the data distribution change metrics 528 sent by DCD 522) and the training metrics (e.g., training accuracy metrics 516 sent by TAD 504). To do so, MPA 502 may comprise the following sub-components: a training vs. inference comparator 508, an abnormal inference drift detector 510, a long-term training drift detector 512, and/or a data-caused inference degradation analyzer 514. These sub-components 508-512 may be combined, omitted, or implemented in a centralized or distributed manner, as desired.

During execution, training vs. inference comparator 508 is responsible for identifying whether an inference model of model inference engine 526 is being used as trained, and to trigger downstream processes to fix the problem, if any arise. Note that the model has been trained on a certain pattern of data and has certain performance metrics such as accuracy, RMSE, percentage of records triggered as anomalies, etc. In a stable scenario, the inference statistics and performance measures should ideally match the ones in the training. For example, if the anomaly detection engine has been trained to detect 2% of the records (outliers) as anomalies, then the inference usually, over a long enough time, should also flag 2% of records as anomalous. If the model flags a much larger or smaller percentage of records as anomalous, then this may be an indication that the model is misbehaving. Comparator 508 may make similar analysis with respect to classification models, such as by determining whether the model is misbehaving with respect to its distribution of losses or detection probability (probability of positives).

Figure 7:
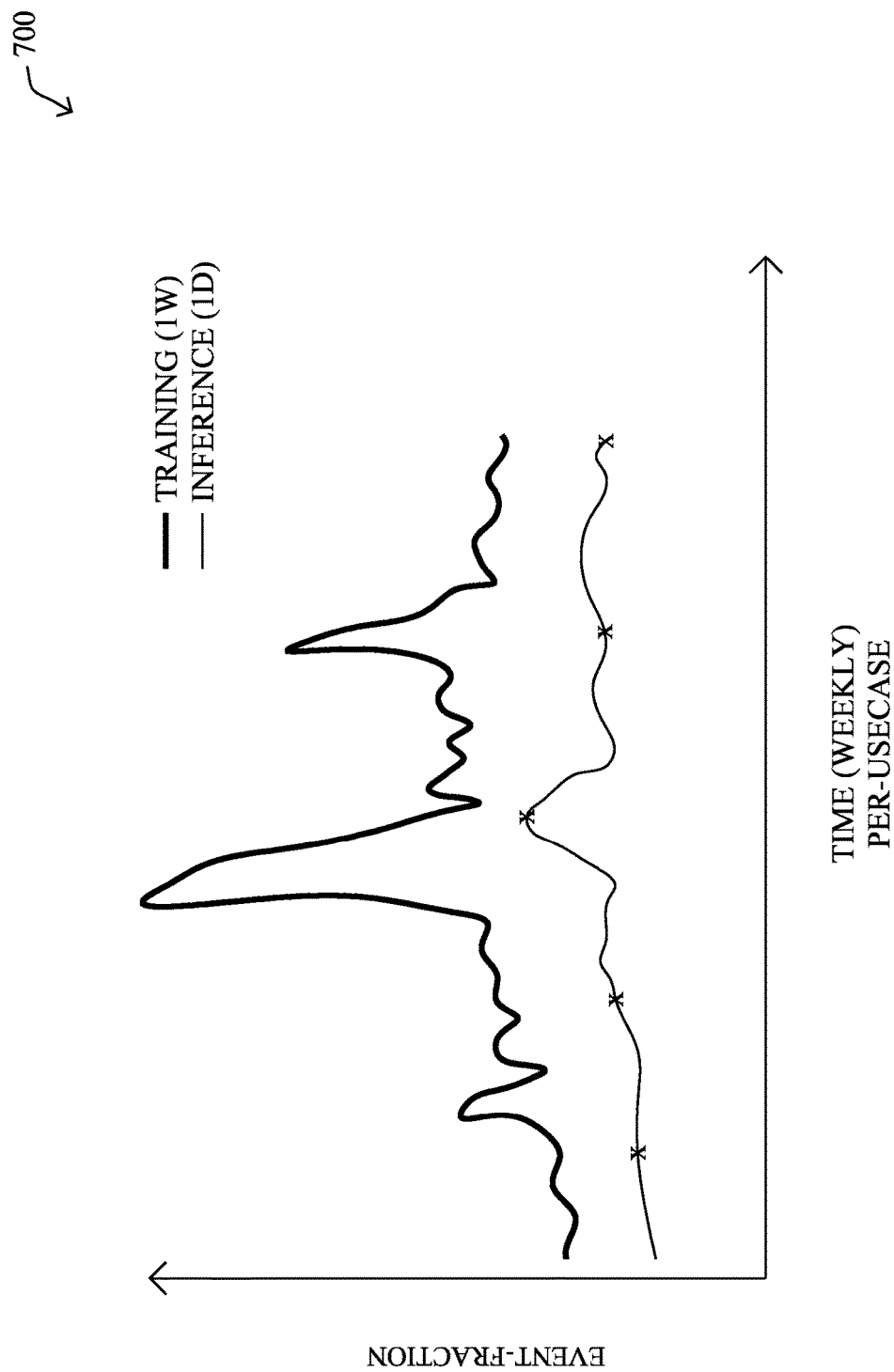
FIG. 7 illustrates an example plot comparing event-fractions between training and inference phases of a model.

In one embodiment, training vs. inference comparator 508 will correlate the training metrics with their respective inference accuracy metrics (e.g., metrics 516 and 530), and will raise an anomaly of it detects a significant shift. For example, consider plot 700 in FIG. 7 that shows the event-fraction (e.g., the fraction of records flagged by a model as anomalous) observed for the model during both its training phase and inference/deployment phase. Assume now that the anomaly detection model is retrained every week and its inference metrics captured and reported to ML Ops service 408 on a daily basis. In such a case, training vs. inference comparator 508 of service 408 may compare the two event-fraction timeseries shown in plot 700, to detect deviations and, if any deviations are detected, trigger further processing by MPA 502.

Referring again to FIG. 5, when training vs. inference comparator 508 detects a deviation between the performance of the model during its training and deployment/inference phases, comparator 508 may raise a 'relative inference deviation' event. In one embodiment, comparator 508 may report such an event to model inference engine 526 (e.g., via model inference actions 532) and/or the networking devices associated with network monitoring service 520, to stop using the model to make inferences and avoid any ill-effects of inaccurate inferences.

In another embodiment, training vs. inference comparator 508 may send an indication of the relative inference deviation event to model selection engine 506, to trigger retraining of the model or selection of another model to take its place.

In cases in which ML Ops service 408 and network monitoring service 520 are associated with multiple networks, training vs. inference comparator 508 may further assess whether any model accuracy deviations are localized to a specific network or present across multiple networks. If, for example, a majority of networks all exhibit such deviations, this may indicate that a more serious issue exists that requires a system-wide fix. In this case, comparator 508 may send a more severe alarm via the UI, to alert developers and administrators as to the problem.

During execution, abnormal inference drift detector 510 may determine whether any drift in the performance of the model of model inference engine 526 over time is normal or anomalous (e.g., drifts in inference accuracy metrics 530). Indeed, it is to be expected that the accuracy of the model will drop somewhat over time, especially when the inter-training periods are long (e.g., one month). If drift detector 510 determines that this drift is anomalous, it may initiate similar corrective measures as that of comparator 508, such as pausing use of the model by model inference engine 526 (e.g., by sending a model inference action 532 to engine 526), initiating model retraining (e.g., by sending an action 518 to model selection engine 506), and/or sending an alert to the UI.

Figure 8:
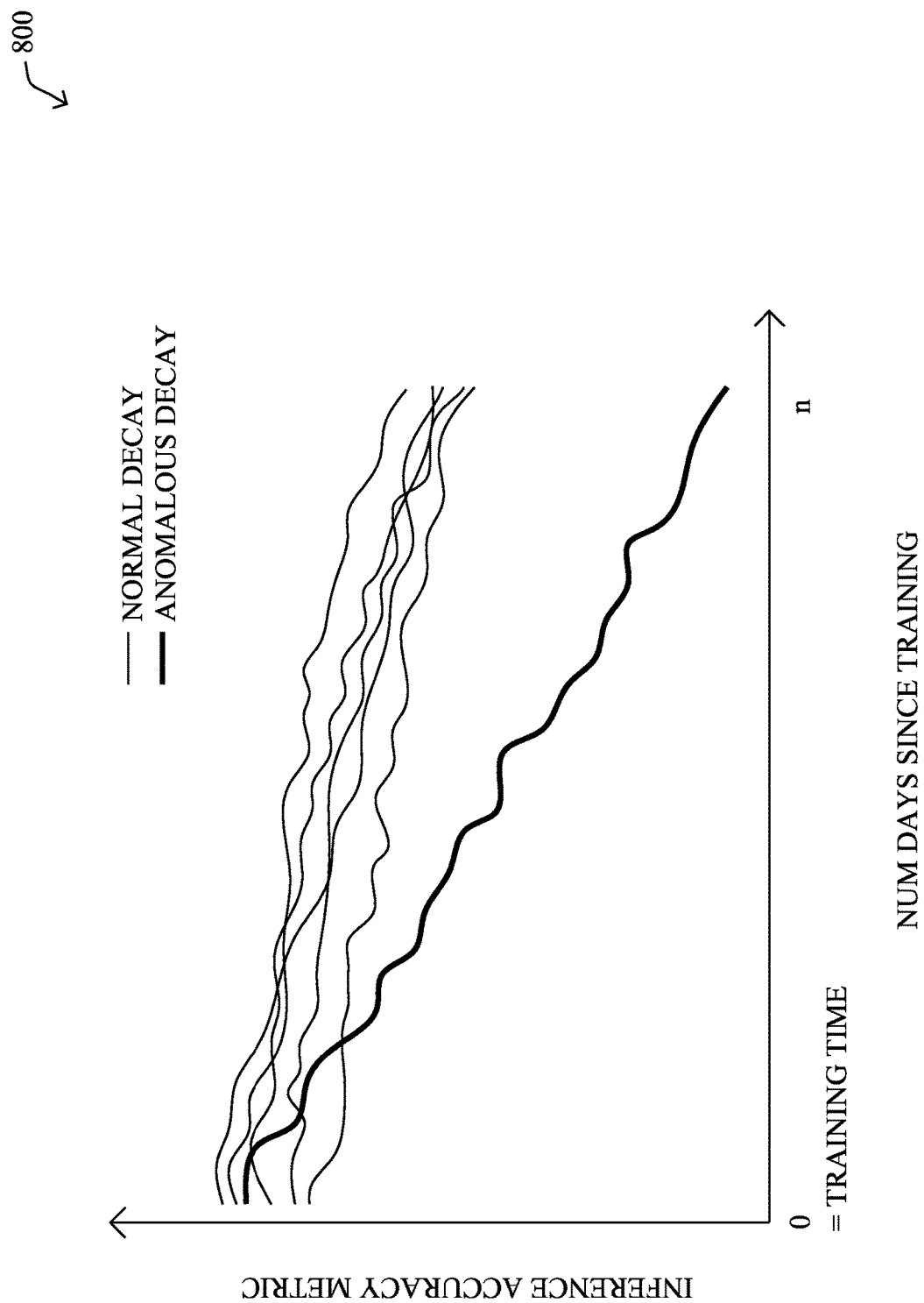
FIG. 8 illustrates an example plot showing the drift in inference accuracy of a model over time.

Plot 800 in FIG. 8 shows a plot of the inference accuracy metric for a model over time. More specifically, assume that the model associated with the accuracy metric is retrained periodically every n-number of days and its inference accuracy metric is measured on a daily basis. Accordingly, each line plotted in plot 800 represents the decay of the inference accuracy of the model in between training phases.

As can be seen in plot 800, some decay of the inference accuracy of the model during the inter-training periods is somewhat normal. However, one drift is clearly abnormal in comparison to the other observed drifts and may be flagged by abnormal inference drift detector 510 as anomalous.

Referring again to FIG. 5, abnormal inference drift detector 510 may compute the 'normal' drift of the inference performance metric of the model of model inference engine 526 using a timeseries clustering algorithm, in one embodiment. In turn, abnormal inference drift detector 510 may assess the results for outliers/anomalies. In another embodiment, abnormal inference drift detector 510 may assess the relative drift of multiple inference accuracy metrics (e.g., event-fraction and quantile loss) by forming a multivariate timeseries and apply a sequence-to-sequence autoencoder model to the timeseries, to cluster and detect outliers that exhibit degraded drifts.

Note that the only a short amount of time may have passed since the model was last trained (e.g., a few days) and the above approaches that abnormal inference drift detector 510 may use are applicable only after an entire timeseries for the inter-training time has been built. In further embodiments, these approaches can also be adapted for early detection of severe inference accuracy drifts. For example, if the inference accuracy metric(s) of the model are only available for the past m-number of days and the inter-training period is n-number of days, the clustering algorithm of abnormal inference drift detector 510 can still be trained using metrics for all 0-m days and used to detect any abnormal drops in the inference accuracy metric(s) during this timeframe, as well.

In various embodiments, MPA 502 may further comprise a long-term training drift detector 512 that is responsible for detecting when the training accuracy metrics 516 are slowly dropping over longer periods of time. To do so, long-term training drift detector 512 may evaluate timeseries of training accuracy metrics 516 from TAD 504. In a simple embodiment, long-term training drift detector 512 may determine the trend of the training accuracy metrics 516 using a timeseries decomposition approach. If the trend is decreasing with a significant slope, then long-term training drift detector 512 may initiate corrective measures, such as raising an alert to the UI, pausing inferences by the model (e.g., via model inference actions 532), initiate model retraining or reselection (e.g., via action 518), etc.

In another embodiment, long-term training drift detector 512 may assess whether similar long-term training drifts occur across a plurality of networks. If such a slow drift occurs, this may indicate that simply retraining the model may not be effective and that the machine learning engineers responsible for the model may need to redesign the model (e.g., by using a different model architecture). Thus, in these cases, long-term training drift detector 512 may raise a corresponding alert to the UI, to alert the engineers as to this condition.

With respect to determining the root cause of any model performance issues, the actual root cause may be due to data quality issues, data distribution changes, or issues related to the training of the model.

To help discern the root cause of such issues, MPA 502 may correlate the inference accuracy metric for the model with the distribution difference observed in several features. The highest correlated feature can then be tagged as the probable cause for the inference drift. In such cases, MPA 502 may request refined data from the networking devices for the data. Note that simple correlation of continuous variables is not sensitive to extreme values and that they are equally sensitive to all range of values that a variable (e.g., distribution difference metric) might take.

In a further embodiment, MPA 502 may also include data-caused inference degradation analyzer 514 that is responsible for determining whether any data distribution changes (e.g., as indicated by metrics 528 from DCD 522) are responsible for any degradation in the inference accuracy metrics 530 from IA 524. For example, analyzer 514 may discretize the inference accuracy metrics 530 (e.g., across all deployments) into 'Positive' and 'Negative' classes, where the 'Positive' class indicates severe drops in the inference accuracy metric(s) and the 'Negative' class indicates normal changes. In turn, analyzer 514 may train a decision tree using the classes and the data distribution change metrics 528 (e.g., median, $75^{th}$ percentile, etc.) to identify rules that can be used for purposes of root-causing model performance issues.

For example, if the severe inference accuracy drop occurs when the data distribution exhibits a median>threshold_1 AND $75^{th}$ percentile>threshold_2, then analyzer 514 may infer that the model of engine 526 may not be effective to use under such situations. In turn, analyzer 514 may propagate such a rule to model inference engine 526 as data check actions 534, which engine 526 uses to assess the distribution characteristics of the data and determines whether or not to pause use of the model (e.g., on a daily basis). Other corrective measures that analyzer 514 may initiate could also entail raising an alert to the UI or initiating model retraining or reselection (e.g., by sending an action 518 to model selection engine 506).

Figure 9:
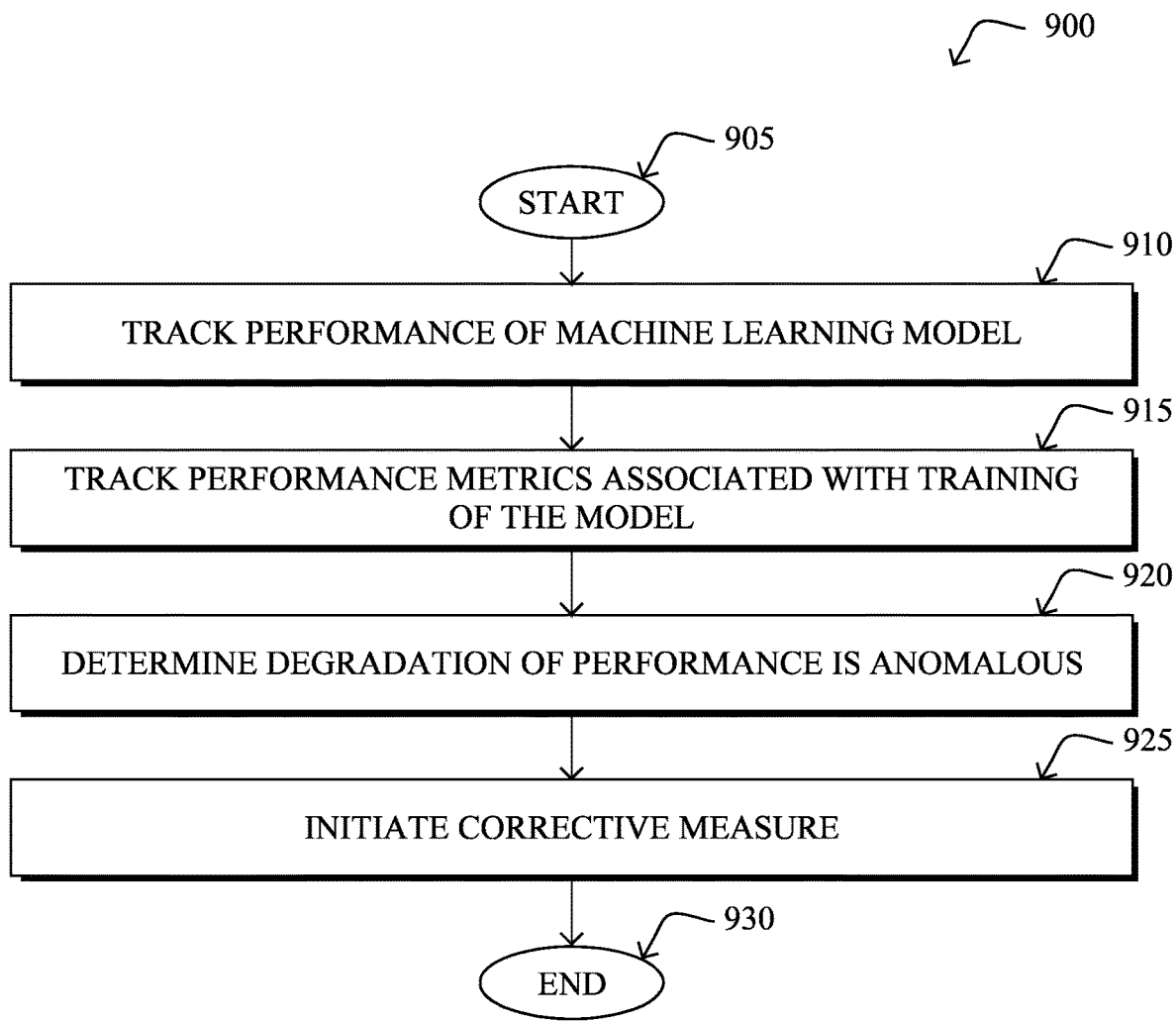
FIG. 9 illustrates an example simplified procedure for performing anomaly detection of model performance of a machine learning model.

FIG. 9 illustrates an example simplified procedure for performing anomaly detection of model performance of a machine learning model, in accordance with one or more embodiments described herein. For example, a non-generic, specifically configured device may perform procedure 900 by executing stored instructions, to provide an ML Ops service to one or more networks. The procedure 900 may start at step 905, and continues to step 910, where, as described in greater detail above, the service may track performance of a machine learning model over time. In various embodiments, the machine learning model is used to monitor one or more computer networks based on data collected from the one or more computer networks. For example, the model may be configured to detect problems in a wireless network, predict tunnel failures in an SD-WAN or other network, classify devices in the network(s) by device type, or the like. In further embodiments, the model may take the form of an anomaly detector, a classifier, or other form of machine learning model. Accordingly, the tracked performance may be indicative of a percentage of anomalies raised by the anomaly detector for the one or more networks, indicative of a detection probability of the classifier, a recall or precision of the model, etc.

At step 915, as detailed above, the service may track performance metrics associated with training of the machine learning model. In general, the performance metrics associated with the training may be indicative of the accuracy of the model as observed during training and testing of the model, prior to deployment to make inferences about the one or more networks. For example, in the case in which the model comprises an anomaly detector, the performance metrics may indicate the percentage of records that the model was trained to identify as anomalous (e.g., the 2% most anomalous records).

At step 920, the service may determine that a degradation of the performance of the machine learning model is anomalous, as described in greater detail above. In various embodiments, the service may base this determination on the tracked performance of the machine learning model and performance metrics associated with training of the model. For example, in one embodiment, the service may detect an anomaly in a correlation between the tracked performance of the machine learning model and the performance metrics associated with training of the machine learning model. In another embodiment, the service may determine whether a drift in the performance of the machine learning model between times at which the model the model is trained is anomalous. In further embodiments, the service may further track distribution changes in the data collected from the one or more networks (e.g., the data from the one or more networks consumed by the model) and base the determination on these tracked changes. For example, the service may determine whether the degradation of the performance of the machine learning model is correlated to a distribution change in the data collected from the one or more networks.

At step 925, as detailed above, the service may initiate a corrective measure for the degradation of the performance of the machine learning model, in response to determining that the degradation of the performance is anomalous. For example, in various embodiments, the corrective measure may entail pausing use of the machine learning model to monitor the one or more computer networks, retraining the machine learning model, or sending an alert regarding the anomalous degradation of the performance of the model to a user interface. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the continuous monitoring of the performance of a machine learning model used to monitor a network, so as to detect performance anomalies. Indeed, it is to be expected that the performance of such a model may degrade over time for various reasons such as data quality issues (e.g., data distribution changes in the data ingested by the model), training issues, or the like. Accordingly, the techniques herein introduce a number of mechanisms to detect anomalous degradations in the performance of the model and initiate corrective measures, such as adjusting the data collection mechanism in the monitored network(s), initiate retraining of the model, pausing use of the model under certain circumstances, or the like.

While there have been shown and described illustrative embodiments that provide for detecting model performance anomalies in an ML Ops system, it is to be understood that various other adaptations and modifications may be made within the spirit and scope of the embodiments herein. For example, while certain embodiments are described herein with respect to using certain models for purposes of network monitoring, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
tracking, by a service and over time, performance of a machine learning model trained to assess network traffic in a network;
tracking, by the service, performance metrics associated with training of the machine learning model;
determining, by the service, that degradation of the performance of the machine learning model is anomalous, based on the performance of the machine learning model and the performance metrics associated with the training of the machine learning model; and
initiating, by the service, a corrective measure for the degradation of the performance of the machine learning model, in response to determining that the degradation of the performance of the machine learning model is anomalous.

2. The method as in claim 1, further comprising:
determining, by the service, a root cause of the degradation of the performance of the machine learning model.

3. The method as in claim 2, wherein the root cause of the degradation of the performance of the machine learning model is a degradation of quality of data being input to the machine learning model.

4. The method as in claim 1, wherein determining whether the degradation of the performance of the machine learning model is anomalous is based on a correlation between the performance of the machine learning model and the performance metrics associated with training of the machine learning model.

5. The method as in claim 4, further comprising:
detecting, by the service, an anomaly in the correlation between the performance of the machine learning model and the performance metrics associated with training of the machine learning model.

6. The method as in claim 1, further comprising:
detecting, by the service, a drift in the performance metrics associated with training of the machine learning model.

7. The method as in claim 1, further comprising:
determining, by the service, that the degradation of the performance of the machine learning model occurs between times at which the machine learning model is trained.

8. The method as in claim 1, further comprising:
tracking distribution changes in data being input to the machine learning model, wherein the service determines that the degradation of the performance of the machine learning model is anomalous based further on the distribution changes in data.

9. The method as in claim 1, wherein the machine learning model comprises an anomaly detector, and wherein the performance of the machine learning model is indicative of a percentage of anomalies raised by the anomaly detector in a network.

10. The method as in claim 1, wherein the machine learning model comprises a classifier configured to classify devices in a network by device type, and wherein the performance of the machine learning model is indicative of a detection probability of the classifier.

11. The method as in claim 1, wherein the corrective measure comprises at least one of: pausing use of the machine learning model or retraining the machine learning model.

12. An apparatus, comprising:
one or more network interfaces;
a processor coupled to the one or more network interfaces and configured to execute one or more processes; and
a memory configured to store a process that is executable by the processor, the process when executed configured to:
track, over time, a-performance of a machine learning model trained to assess network traffic in a network;
track performance metrics associated with training of the machine learning model;
determine that degradation of the performance of the machine learning model is anomalous, based on the performance of the machine learning model and the performance metrics associated with the training of the machine learning model; and
initiate a corrective measure for the degradation of the performance of the machine learning model, in response to determining that the degradation of the performance of the machine learning model is anomalous.

13. The apparatus as in claim 12, wherein the process when executed is further configured to:
determine a root cause of the degradation of the performance of the machine learning model.

14. The apparatus as in claim 13, wherein the root cause of the degradation of the performance of the machine learning model is a degradation of quality of data being input to the machine learning model.

15. The apparatus as in claim 12, wherein determining whether the degradation of the performance of the machine learning model is anomalous is based on a correlation between the performance of the machine learning model and the performance metrics associated with training of the machine learning model.

16. The apparatus as in claim 15, wherein the process when executed is further configured to:
detect an anomaly in the correlation between the performance of the machine learning model and the performance metrics associated with training of the machine learning model.

17. The apparatus as in claim 12, wherein the process when executed is further configured to:
determine that the degradation of the performance of the machine learning model occurs between times at which the machine learning model is trained.

18. The apparatus as in claim 12, wherein the process when executed is further configured to:
track distribution changes in data being input to the machine learning model, wherein the degradation of the performance of the machine learning model is determined to be anomalous based further on the distribution changes in data.

19. A tangible, non-transitory, computer-readable medium storing program instructions that cause a service to execute a process comprising:
tracking, by the service and over time, a-performance of a machine learning model trained to assess network traffic in a network;
tracking, by the service, performance metrics associated with training of the machine learning model;
determining, by the service, that degradation of the performance of the machine learning model is anomalous, based on the performance of the machine learning model and the performance metrics associated with the training of the machine learning model; and
initiating, by the service, a corrective measure for the degradation of the performance of the machine learning model, in response to determining that the degradation of the performance of the machine learning model is anomalous.

* * * * *

UNITED STATES PATENT AND TRADEMARK OFFICE
CERTIFICATE OF CORRECTION

| | | |
|---|---|---|
| PATENT NO. | : 12,199,847 B2 | Page 1 of 1 |
| APPLICATION NO. | : 17/696532 | |
| DATED | : January 14, 2025 | |
| INVENTOR(S) | : Vinay Kumar Kolar et al. | |

It is certified that error appears in the above-identified patent and that said Letters Patent is hereby corrected as shown below:

In the Specification

Column 7, Line 10 please amend as shown:
tunnel is likely to fail. In such a case, the false positives of Column 8, Line 6 please amend as shown:
AP1 through nth access point APn) that provide connec- In the Claims Column 21, Line 28 please amend as shown:
track, over time, performance of a machine learning Column 22, Line 30 please amend as shown:
tracking, by the service and over time, performance of Signed and Sealed this
Fifteenth Day of April, 2025

Coke Morgan Stewart
*Acting Director of the United States Patent and Trademark Office*